(12) United States Patent
Baer et al.

(10) Patent No.: US 7,551,804 B2
(45) Date of Patent: Jun. 23, 2009

(54) METHOD AND APPARATUS FOR DISTRIBUTED ANALYSIS OF IMAGES

(75) Inventors: Richard L. Baer, Los Altos, CA (US); John Stewart Wenstrand, Menlo Park, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 12/138,579

(22) Filed: Jun. 13, 2008

(65) Prior Publication Data

US 2008/0253614 A1    Oct. 16, 2008

Related U.S. Application Data

(63) Continuation of application No. 11/011,073, filed on Dec. 15, 2004, now Pat. No. 7,406,216.

(51) Int. Cl.
*G06K 9/32* (2006.01)
*G06K 9/46* (2006.01)

(52) U.S. Cl. .................................. 382/299; 382/190

(58) Field of Classification Search ................ 382/100, 382/103, 141, 143, 299, 312, 305, 190; 348/135, 348/139; 340/5.53
See application file for complete search history.

(56) References Cited

U.S. PATENT DOCUMENTS

| 4,949,391 A | 8/1990 | Faulkerson et al. |
| 6,493,022 B1 | 12/2002 | Ho et al. |
| 7,257,275 B2 * | 8/2007 | Messina et al. ............. 382/299 |

FOREIGN PATENT DOCUMENTS

JP    2003-116139    4/2003

OTHER PUBLICATIONS

European Search Report, Appln. No. GB 0522504.0, dated Jan. 25, 2006.

* cited by examiner

*Primary Examiner*—Yon Couso
(74) *Attorney, Agent, or Firm*—Ratner Prestia

(57) ABSTRACT

A method and apparatus for intelligent distributed analyses of images including capturing the images and analyzing the captured images, where feature information is extracted from the captured images. The extracted feature information is used in determining whether a predefined condition is met, and the extracted feature information is transmitted for further analysis when the predefined condition is met. The extracted feature information is stored and is used to generate statistical information related to the extracted feature information. Further, additional feature information is provided from other databases to implement further analysis including an event detection or recognition. Accordingly, distributed intelligent analyses of images is provided for analyzing captured images to efficiently and effectively implement event detection or recognition.

14 Claims, 3 Drawing Sheets

METHOD AND APPARATUS FOR DISTRIBUTED ANALYSIS OF IMAGES

CROSS REFERENCE TO RELATED APPLICATIONS

This application is a Continuation of U.S. application Ser. No. 11/011,073 filed Dec. 15, 2004.

BACKGROUND OF THE INVENTION

As the use of images for event detection or recognition becomes more pervasive, efficient ways of analyzing images becomes essential. Generally, analyzing images for event detection or recognition consists of capturing the images and analyzing the captured images using human operators. For example, images of an entrance into a building or room captured by a video camera are maintained such that a human operator subsequently reviews the captured images to determine whether a person has entered the building or room. In this situation, the human operator must constantly monitor the captured images to determine an occurrence of an event or an existence of a condition, and a significant amount of captured images that need to be monitored must be transmitted from the video camera.

A typical system for capturing and analyzing images requires that image signals be carried over dedicated coaxial cable, fiber optic line, etc., and further requires that electrical power be supplied to support continuous operation. Thus, the cost of the typical system is significant.

Other solutions for image processing have been proposed where processing of captured images is implemented using a processor in an image capturing device such that an alert or an alarm is triggered when a change occurs. For example, an image capturing device, such a camera in front of a store, may be provided with a processor for processing images captured by the camera so that the camera triggers an alarm when a number of pixels between consecutive images exceeds a certain threshold. However, a processor installed on a camera has limited capability due to size, weight, cost, power limitations, etc., and thus, does not enable complex event detection or recognition. Further, due to the limited processing capability of the processor installed on the camera, accurate event detection or recognition can not be implemented, thereby increasing the rate of false alerts or alarms.

Accordingly, it is important to provide intelligent distributed analyses of images for efficient event detection or recognition. This becomes especially important as image analysis continues to be necessitated by different purposes, such as for security purposes, etc. Thus, there is a need for intelligent distributed analyses of images that addresses the above-mentioned and other limitations.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
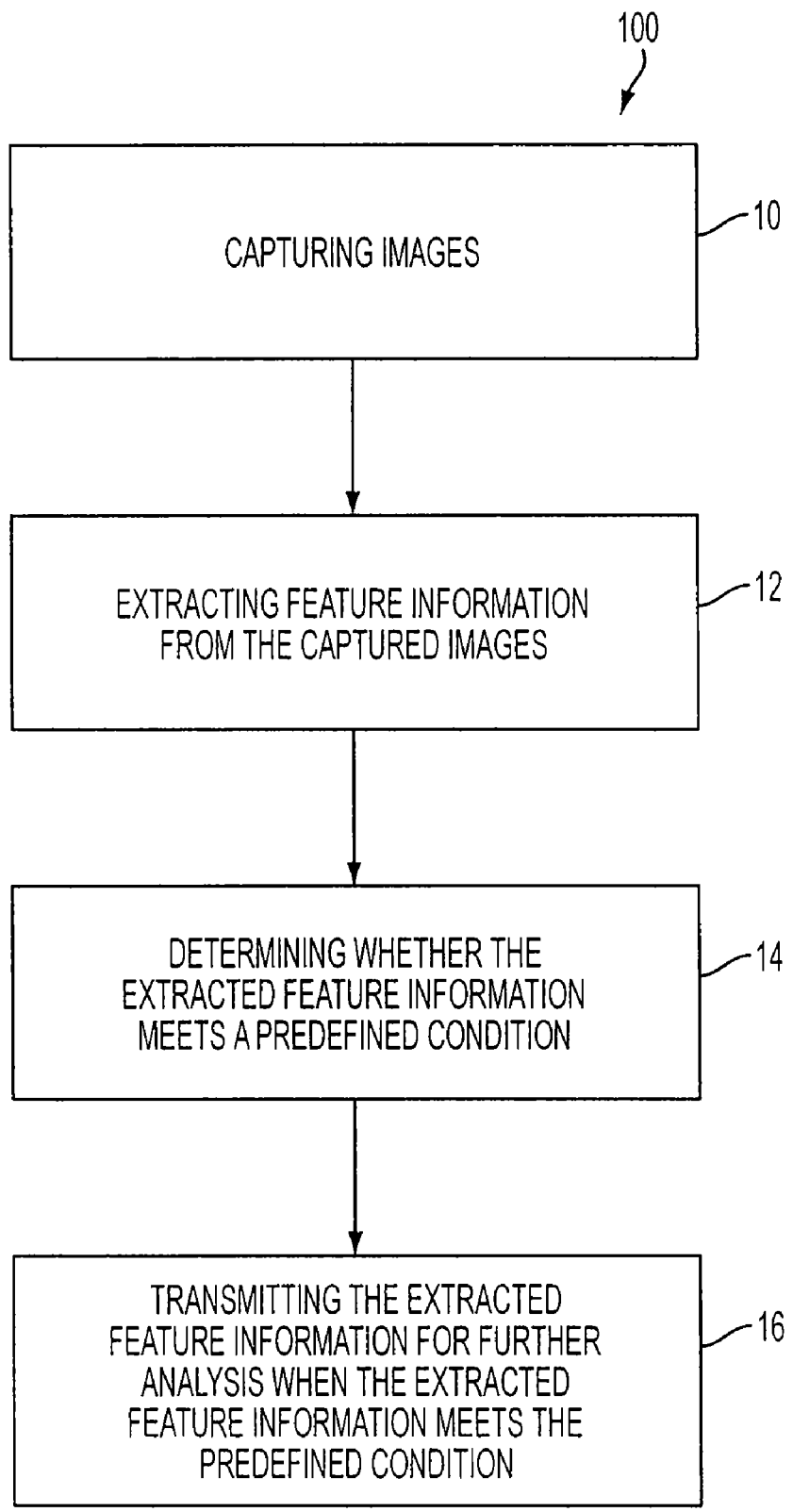
FIG. 1 is a diagram illustrating a process of capturing images, extracting feature information from the captured images, determining whether the extracted feature information meets a predefined condition and transmitting the extracted feature information for further analysis, according to an embodiment of the present invention.

Various embodiments of the present invention provide a method including (a) capturing digital image data by a sensor, (b) extracting feature information in real-time from the captured digital image data and determining whether the extracted feature information meets a predefined condition by the sensor, and (c) transmitting the extracted feature information to a remote device for further analysis when the sensor determines that that the extracted feature information meets the predefined condition.

Various embodiments of the present invention provide an apparatus including (a) a sensor capturing images, and (b) a processor extracting feature information from the captured images, determining whether changes in the extracted feature information pass a threshold level and causing the extracted information to be sent to a remote device for further analysis when the processor determines that the changes pass the threshold level.

Moreover, various embodiments of the present invention provide a distributed event detection apparatus including (a) a plurality of image sensors capturing image data and interpreting the captured image data to extract feature information from the captured image data, and (b) a server connected with the plurality of image sensors receiving the extracted feature information for further analysis including an event detection, where the plurality of image sensors transmit the extracted feature information of the captured image to the server when the extracted feature information meets a predefined condition.

Various embodiments of the present invention provide present invention further provides a method including (a) capturing a plurality of low resolution digital images via multiple distributed sensors, (b) combining the captured plurality of low resolution digital images into a single high resolution digital image, and (c) extracting feature information from the high resolution digital image.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 is a diagram illustrating a process 100 for capturing images, extracting feature information from the captured images, determining whether the extracted feature information meets a predefined condition and transmitting the extracted feature information from the captured images for further analysis, according to an embodiment of the present invention. Referring to FIG. 1, in operation 10, images are captured. For example, according to an embodiment of the present invention, still images are captured using a sensor. The present invention, however, is not limited to using one sensor. Instead, multiple sensors may be provided to capture still images. Moreover, the present invention is not limited to the captured images being "still" images.

It is well known how to capture an image. The image may be captured using a sensor such as, for example, a digital camcorder, a digital still camera, a cellular telephone, a personal digital assistant, or other devices responsive to a particular motion, sound, light, etc. Generally, these sensors incorporate an image capturing device, typically a charge coupled device (CCD) or a CMOS image sensor (CIS), that registers the image, and image processing hardware and/or software that converts a raw signal produced by the image sensor to useful image data, such as CCIR or JPEG data. However, the present invention is not limited to any particular type of sensor.

Referring to FIG. 1, from operation 10, the process 100 moves to operation 12, where feature information is extracted from the captured images. The feature information can be extracted using various methods, and thus, the present invention is not limited to any specific method of extracting feature information from captured images. For example, the present invention can be set up to extract essential feature information related to relative brightness or chromaticity values of images to detect a change between the brightness or chromaticity values of images. Further, an algorithm can be used to determine when a change has occurred, for example, by computing a difference between consecutive images based on a count of a number of pixels in the images and indicating when the difference exceeds a certain value. Various feature information extraction methods are well known.

From operation 12, the process 100 moves to operation 14, where it is determined whether the extracted feature information meets a predefined condition. For example, according to an embodiment of the present invention, it is determined whether a change has occurred based on a difference computed between a number of pixels in consecutive images using an algorithm. In this situation, the change based on the difference computed between the number of pixels in the images is the predefined condition. However, the present invention is not limited to a predefined condition determined based on a difference between computed number of pixels.

From operation 14, the process 100 moves to operation 16, where the extracted feature information is transmitted for further analysis when the extracted feature information meets the predefined condition. For example, in relation to the example discussed in the previous paragraph, the extracted information is transmitted for further analysis upon determining that the change has occurred based on the difference computed between the number of pixels in the images. Further, according to an embodiment of the present invention, the transmitted feature information includes, for example, a single image or a small number of images.

The present invention is not limited to a particular number of subsequent analyses of feature information. For example, upon determining that the change has occurred based on the difference computed between the number of pixels in the images and transmitting the feature information, it is possible to further transmit the feature information for other subsequent analysis.

Accordingly, in process 100, the feature information is extracted from the captured images and it is determined whether the extracted feature information meets a predefined condition. The extracted feature information is then transmitted for further analysis when the extracted feature information meets the predefined condition, thereby implementing intelligent distributed analyses of captured images.

Figure 2:
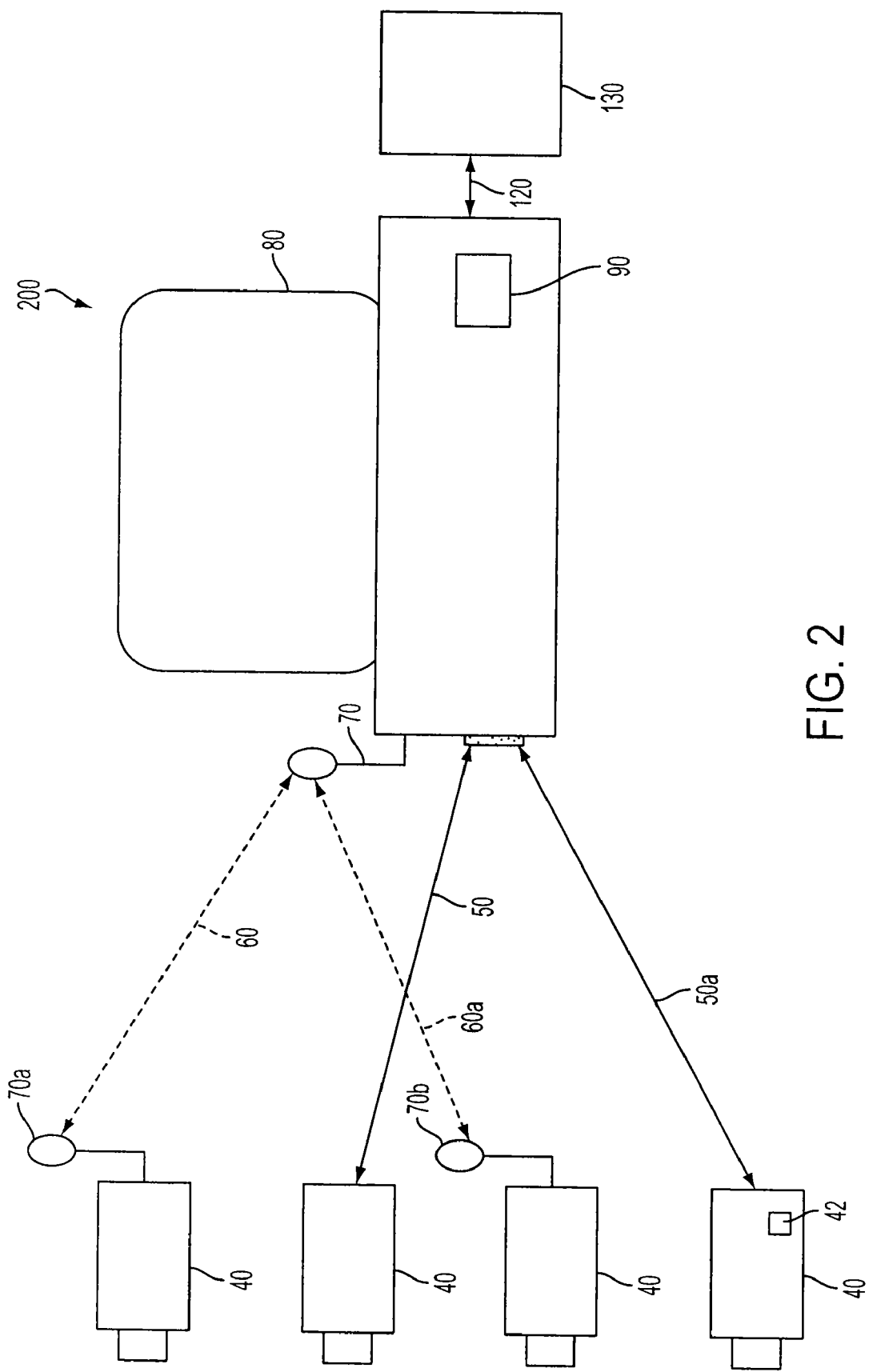
FIG. 2 is a diagram illustrating an apparatus for capturing images, interpreting the captured images to extract feature information from the captured images and sending the extracted information for further analysis, according to an embodiment of the present invention.

FIG. 2 is a diagram illustrating an apparatus for capturing images, interpreting the captured images to extract feature information from the captured images and sending the extracted information for further analysis, according to an embodiment of the present invention. The apparatus in FIG. 2 can be used to implement the process 100 of FIG. 1.

Referring to FIG. 2, a distributed event detection apparatus 200 is provided. The distributed event detection apparatus 200 comprises multiple sensors 40 to capture still images. The distributed event detection apparatus 200 also includes a hub 80. The sensors 40 are connected with the hub 80. The hub 80 is connected with a remote device 130 by a connection 120.

The embodiment in FIG. 2 shows an example in which some of the sensors 40 are connected with the hub 80 by wireless connections 60 and 60a communicating with a wireless interface 70 of the hub 80 via wireless interfaces 70a and 70b. The wireless connections 60 and 60a can be enabled using wireless communication protocols, such as IEEE 802.11b, Bluetooth, etc. However, the wireless connections 60 and 60a are not limited to a specific wireless communication protocol.

The embodiment in FIG. 2 shows other of the sensors 40 connected with the hub 80 by wired connections 50 and 50a.

Although FIG. 2 shows some of the sensors 40 connected with the hub 80 by wireless connections 60 and 60a and others of the sensors 40 connected with the hub 80 by wired connections 50 and 50a, embodiments of the present invention are not limited to the use of wireless and/or wired connections, or any particular types of protocols. Moreover, embodiment of the present invention are not limited to different sensors having different types of connections. In addition, embodiments of the present invention are not limited to using any particular number of sensors 40.

As mentioned above, the apparatus in FIG. 2 can be used to implement the process in FIG. 1. For example, in an embodiment of the present invention, operations 10 and 12 of FIG. 1 can be implemented by sensors 40, with operation 14 and 16 in FIG. 1 being implemented by the hub 80.

As a more concrete example, referring to FIG. 2, the sensors 40 capture still images, extract feature information from the captured images and transmit the extracted feature information to the hub 80. For example, according to an embodiment of the present invention, the sensors 40 extract feature information related to chromaticity values of the captured images based on an algorithm and transmit the extracted feature information to the hub 80 for determination of whether the chromaticity values meet a predefined condition. However, there are many different manners and algorithms for extracting feature information, and the present invention is not limited to any particular manner or algorithm. Therefore, in this example, the sensors 40 perform operations 10 and 12 in FIG. 1, and the hub 80 performs operation 14. The hub 80 might also transmit the feature information to the remote device 130 for further analysis, thereby performing operation 16. In other embodiments, the hub 80 may also perform the further analysis.

In a different embodiment of the present invention, operation 10 in FIG. 1 can be implemented by a sensor 40, operation 12 in FIG. 1 can be implemented by the hub 80, and operations 14 and 16 in FIG. 1 can be implemented by the remote device 130.

As a more concrete example, referring to FIG. 2, the sensors 40 capture still images, and transmit the captured images to the hub 80. For example, according to an embodiment of the present invention, the sensors 40 capture images and transmit the captured images to the hub 80 where the hub extracts feature information related to, for example, chromaticity values of the captured images and transmits the feature information to the remote device 130. The remote device 130 determines whether the chromaticity values meet a predefined condition. Further, the remote device 130 can transmit the feature information for further analysis upon determining that the chromaticity values meet the predefined condition. Therefore, in this example, the sensors 40 perform operations 10 in FIG. 1, the hub 80 performs operation 12 and the remote device 130 performs operations 14 and 16.

Further, in some embodiments, operations 10, 12, 14 and 16 of FIG. 1 can performed by the sensors 40.

As a more concrete example, referring to FIG. 2, the sensors capture the images, extract feature information from the captured images and determine whether the feature information meets a certain condition. In this embodiment, the sensors 40 perform operations 10, 12, 14 and 16 of FIG. 1, and the hub 80 performs the further analysis. For example, one of the sensors 40 shown in FIG. 2 that is provided with a processor 42 determines whether the chromaticity values of captured images exceeds a threshold value and transmits the feature information related to the chromaticity values of the images to the hub 80 for further analysis. Accordingly, the threshold that has been determined to be met by one of the sensors 40 can be re-evaluated by the hub 80. However, the present invention is not limited to implementing a determination of an occurrence of a condition at a sensor or a hub, instead, such determination can be implemented at a sensor and/or a hub. While only one of the sensors 40 in FIG. 2 is shown to have a processor 42, the present invention is not limited to any particular number of processors that are provided to the sensors 40. For example, it is possible to provide a processor for each of the sensors 40 that are connected with the hub 80. Further, the present invention is not limited to any specific number of sensors.

The present invention is not limited to operations 10 through 16 of FIG. 1 being perform by a specific combination of the sensors 40, the hub 80 and the remote device 130. Instead, the operations 10 through 16 of FIG. 1 can be variously implemented using the sensors 40, the hub 80 and the remote device 130.

Figure 3:
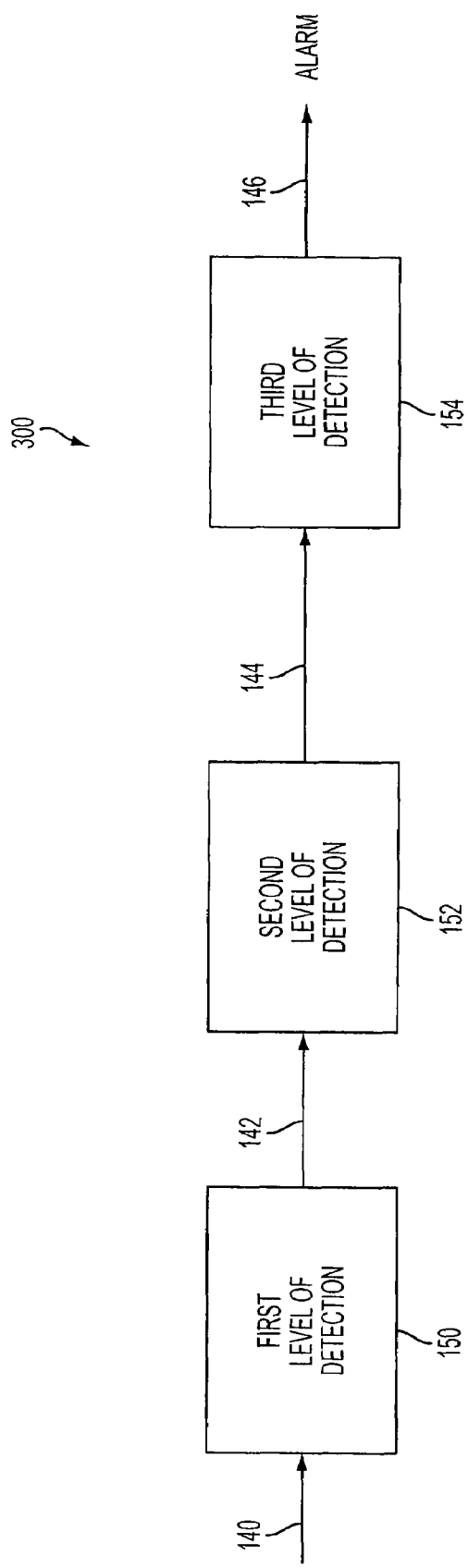
FIG. 3 is a diagram illustrating a process for multiple levels of event detection or recognition, according to an embodiment of the present invention.

FIG. 3 is a diagram illustrating a process 300 for multiple levels of event detection or recognition, according to an embodiment of the present invention. As shown in FIG. 3, the process 300 includes multiple levels of detection 150, 152 and 154. Specifically, FIG. 3 shows a first level of detection 150, a second level of detection 152 and a third level of detection 154 of the process 300 for multiple levels of detection. The first level of detection 150 receives and processes the received images 140 to determine an existence of a condition or an event and transmits a signal 142 to the second level of detection 152 for further analysis. For example, the sensors 40 shown in FIG. 2 capture images of an entrance into a room (images 140 in FIG. 3) and extract feature information related to a number of pixels in the captured images and determine that there is a difference between the number of pixels in the images at the first level of detection 150 of FIG. 3. While the first level of detection 150 is described in relation to a difference between a number of pixels, a first level of detection according to the present invention is not limited to any specific type of detection or determination.

Further, the second level of detection 152 receives and further analyzes the signal 142 to determine an existence of a condition or an event and transmits a signal 144 to the third level of detection 154. Accordingly, in relation to the example in the previous paragraph, the sensors 40 (in FIG. 2) transmit extracted feature information related to the number of pixels in the captured images 142 to a hub 80 (in FIG. 2) for a second level of detection 152 of FIG. 3. In this instance, the hub 80 implements a complex algorithm to determine whether the difference in the number of pixels determined by the sensors 40 at the first level of detection 150 indicates whether a person has entered the room, as opposed to another object, in the second level of detection 152. Further, accordingly to an embodiment of the present invention, the hub 80 transmits signal 144 indicating a determination of whether a person has entered the room for further analysis to, for example, a remote device 130 shown in FIG. 2.

The third level of detection 154 receives and further analyzes the signal 144 to further determine or confirm the existence of the condition or the event, and transmits a signal 146 to trigger an alarm or a notification. For example, in relation to the example in two previous paragraphs, the remote device 130 shown in FIG. 2 receives the signal 144 indicating that a person has entered the room from the hub 80 (also shown in FIG. 2) and makes a further determination, such as whether an identity of the person determined to have entered the room by the hub 80 matches a predetermined identity. According to an embodiment of the present invention, the remote device 130 also transmits the signal 146 to trigger an alarm. This enables multiple levels of event detection or recognition. While the above descriptions of the multiple levels of detection are discussed using a single method of feature extraction (i.e. chrominance changes or pixel number changes between images), the present invention is not limited to using a single method of feature extraction. For example, both the of chrominance or pixel number changes between the images can be implemented to determine whether image data needs to be transmitted for further analysis.

Accordingly, a multi-level event detection or recognition is implemented, according to an aspect of the present invention. For example, an image sensor, a hub and a remote device may be provided to implement first, second and third levels of detection to execute the multi-level event detection or recognition similar to the illustration in FIG. 3. While the process 300 for multiple levels of event detection or recognition in FIG. 3 is illustrated using three levels of detection 150, 152 and 154, the present invention is not limited to three levels of detection. For example, two levels of detection can be implemented where a sensor captures images of an entrance into a room and extracts feature information related to a number of pixels in the captured images for determining whether there is a difference between the number of pixels in the images indicating an entrance into the room at a first level of detection, and the sensor can transmit a result of the determination to a hub or a remote device for a second level of determination, where the hub or remote device triggers an alarm based on whether the second level of determination indicates that the difference between the number of pixels in the images by the sensor results in a determination that a person has entered the room. Accordingly, the present invention can be implemented using two levels of event detection or recognition.

Accordingly, a method and apparatus for intelligent distributed analyses of images is provided. This enables interpretation of captured images at multiple levels, thereby providing an efficient and effective method and apparatus for image analyses. The multiple levels of interpretation enable ambiguities that may exist when analyzing the captured images to be reduced. Further, the flow of information related to the captured images is reduced as the information is transmitted to the multiple levels.

The present invention also enables extraction of feature information from captured images, analysis of the feature information in real-time and transmission of the analyzed feature information for further analysis. This allows the essence of the feature information to be extracted from the captured images and be sent upstream for further analysis, thereby reducing the flow of information. Further, according to an embodiment of the present invention, the sensors extract feature information from captured images, thereby allowing real-time review of the captured images.

Further, the present invention provides distributed analyses of images that can be implemented using various different known feature extraction methods. This allows the distributed analyses of images of the present invention to be used with known methods of extracting meaningful feature information from images.

Additionally, the present invention provides an apparatus including a sensor to capture images and a processor to extract feature information from the captured images. The processor enables the determination of whether changes in the extracted feature information pass a threshold level, and causes the extracted information to be sent to a remote device for further analysis when the processor determines that the changes pass the threshold level.

The present invention are also provides a method of capturing a plurality of low resolution digital images via multiple distributed sensors and combining the captured plurality of low resolution digital images into a single high resolution digital image. The method also includes extracting feature information from the high resolution digital image, determining whether the extracted feature information meet a predefined condition and transmitting the extracted feature information for an event detection upon determining that the low resolution digital images meet the predefined condition.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed:

1. A method for extracting information from images comprising the steps of:
   capturing a plurality of images;
   extracting by a computer device feature information from the captured images;
   determining whether the extracted feature information meets a first predefined condition; and
   transmitting the extracted feature information for further analysis, if the extracted feature information meets the first predefined condition;
   wherein the extracted feature information is analyzed by another device, and
   capturing the plurality of images includes capturing low resolution images; and
   combining the low resolution images into a high resolution image; and further includes
   extracting feature information from the high resolution image, and
   determining whether the extracted feature information meets the first predefined condition;
   wherein the other device includes the following steps:
      analyzing the high resolution image, and
         providing an event detection upon determining that the high resolution image includes information that meets a second predefined condition; and
      the second predefined condition is only examined, if the first predefined condition is met.

2. The method of claim 1, wherein the other device is a remote terminal.

3. The method of claim 1, wherein the other device is a local terminal.

4. The method of claim 1, wherein the other device analyses the extracted feature information, based on a stored feature information.

5. The method of claim 1, wherein the second predefined condition is different from the first predefined condition.

6. The method of claim 1, wherein
   capturing the plurality of images includes receiving images from multiple cameras that observe a scene from different points of view.

7. The method of claim 6, wherein
   the feature information is extracted from the images received from the multiple cameras, and
   the feature information is transmitted for further analysis, if the feature information meets the first predefined condition.

8. A distributed event detection apparatus comprising:
   multiple sensors for capturing image data, each sensor extracting a first feature information for further analysis;
   a centralized processor for receiving the extracted first feature information from the multiple sensors; and
   the centralized processor for analyzing the received extracted first feature information, and providing a first event detection based on the analysis;
   wherein a sensor of the multiple sensors analyses the captured image data and extracts the first feature information, only if a predefined condition is met; and
   the centralized processor receives the first feature information including low resolution image data, and combines the low resolution image data into a high resolution image data; and further includes
   a remote processor for receiving the high resolution image data from the centralized processor, and
   the remote processor for further analyzing the high resolution image data, and providing a second event detection, if the high resolution image data meets another predefined condition.

9. The apparatus of claim 8, wherein the second event detection is different from the first event detection.

10. The apparatus of claim 8, wherein the remote processor and the centralized processor are connected by way of a communications link.

11. A plurality of detection apparatus comprising:
   a first level detector for receiving a first set of data and determining whether the first set of received data includes a first event;
   a second level detector for receiving a second set of data from the first level detector and determining whether the second set of received data includes a second event,
   an alarm provided as an output, when the second set of received data includes the second event, and
   a third level detector for receiving a third set of data from the second level detector,
   wherein the third set of data is received from the second level detector, only if the second set of received data includes the second event.

12. The apparatus of claim 11, wherein the second set of data is transmitted to the second level detector, only if the first set of received data includes the first event.

13. The apparatus of claim 11, wherein
   the third level detector provides another alarm, when the third set of data includes a third event.

14. The apparatus of claim 13, wherein the first, second and third events are different from each other.

* * * * *